US008413045B2

(12) United States Patent
Lemonik et al.

(10) Patent No.: US 8,413,045 B2
(45) Date of Patent: Apr. 2, 2013

(54) RICH BROWSER-BASED WORD PROCESSOR

(75) Inventors: Micah Lemonik, New York, NY (US); Olga S. Belomestnykh, New York, NY (US); Janani R. Ravi, Jersey City, NJ (US); Luiz A. F. Pereira Filho, New York, NY (US)

(73) Assignee: Google Inc., Mountain View, CA (US)

( * ) Notice: Subject to any disclaimer, the term of this patent is extended or adjusted under 35 U.S.C. 154(b) by 35 days.

(21) Appl. No.: 13/084,950

(22) Filed: Apr. 12, 2011

(65) Prior Publication Data

US 2011/0252304 A1    Oct. 13, 2011

Related U.S. Application Data

(60) Provisional application No. 61/323,242, filed on Apr. 12, 2010.

(51) Int. Cl.
*G06F 17/00*    (2006.01)
(52) U.S. Cl. ......................... 715/234; 715/255
(58) Field of Classification Search ................. 715/200, 715/255, 234
See application file for complete search history.

(56) References Cited

U.S. PATENT DOCUMENTS

| | | | | |
|---|---|---|---|---|
| 2004/0044966 | A1* | 3/2004 | Malone | 715/530 |
| 2005/0076330 | A1* | 4/2005 | Almgren et al. | 717/113 |
| 2009/0006454 | A1* | 1/2009 | Zarzar et al. | 707/102 |
| 2011/0252312 | A1* | 10/2011 | Lemonik et al. | 715/255 |
| 2011/0258538 | A1* | 10/2011 | Liu et al. | 715/256 |

OTHER PUBLICATIONS

International Search Report & Written Opinion for Application No. PCT/US2011/032067, dated Jul. 19, 2011, 10 pages.
Miller, Michael. "Cloud Computing: Web-Based Applications That Change the Way You Work and Collaborate Online." Safari Books Online, Aug. 11, 2008. (18 pages).
Roman, T.V. "Cloud Computing and Equal Access for All." Beijing, China, Apr. 22, 2008. (4 pages).
Roman, T.V. "Toward 2w, Beyond Web 2.0." ACM USA, Feb. 2009. (8 pages).

* cited by examiner

*Primary Examiner* — Manglesh M Patel

(57) ABSTRACT

A computer-implemented method for presenting a document for interaction with a user in a web browser includes accessing an electronic model of the document; determining, with a computing device, positions for items in a visual rendering of the electronic model based on relative sizes and positions of other items in the electronic model; and generating, with the computing device, a document object model (DOM) that defines an editing surface, wherein the DOM (a) places placing the items at the determined positions on the editing surface, (b) places a graphic element that represents a cursor at a determined location on the editing surface, and (c) is arranged to receive user input on the editing surface and to correlate a location of the received user input to a location in the electronic model.

20 Claims, 5 Drawing Sheets

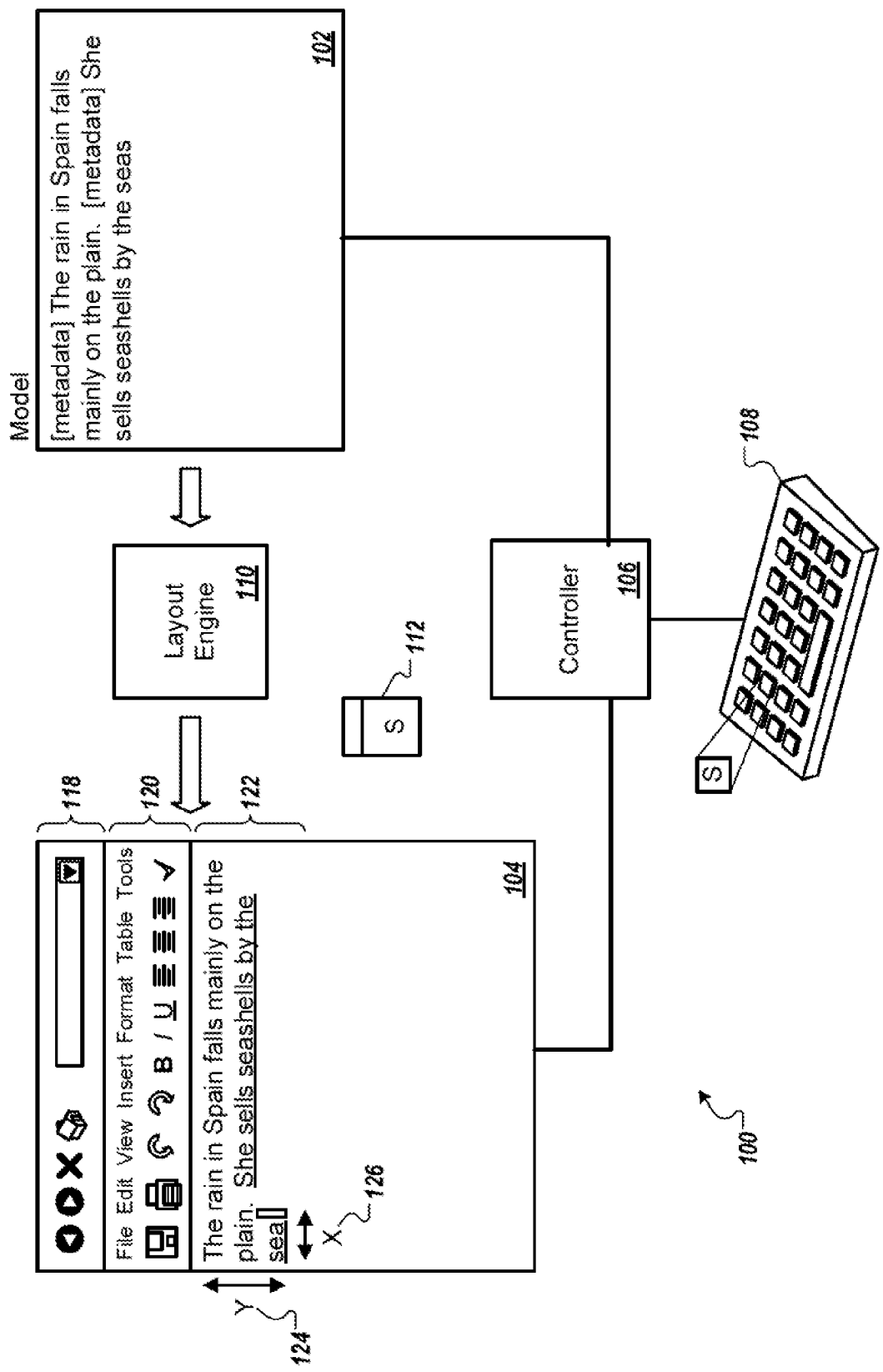

RICH BROWSER-BASED WORD PROCESSOR

CROSS-REFERENCE TO RELATED APPLICATIONS

This application claims priority to U.S. Provisional Application Ser. No. 61/323,242, filed on Apr. 12, 2010, entitled "Rich Browser-Based Word Processor," the entire contents of which are hereby incorporated by reference.

TECHNICAL FIELD

This document relates to systems and techniques for managing a browser-based word processor or other form of document manager.

BACKGROUND

Cloud-based, or hosted, computing generally involves executing applications via a web browser or web app, and obtaining information for the applications from a remote server system or service. Cloud computing provides real advantages over traditional desktop software, such as the ability to access documents from various different computers and locations. Office productivity applications are one type of application currently be delivered by the cloud. For example, users can employ their web browsers to edit word processing and spreadsheet documents that are stored on hosted server systems, can access enterprise resource planning (ERP) applications, can edit photos, and can perform most other activities that they could previously perform only with desktop productivity software.

Web browsers do, however, place a number of limits on programs that run on them, such as JavaScript programs. For example, web browsers may offer programmers HTML elements that are very simple to implement but can be rather inflexible. For example, a browser text box can be a simple way for a programmer to acquire textual input from a user of a browser, but the manner is which the text is presented is relatively bland, and does not come close to providing a WYSIWYG experience. Also, browsers do not provide access to native text rendering capabilities, do not generally permit much flexibility in positioning images on a web page, and cannot natively execute other functions that are expected from a full-featured word processor application.

SUMMARY

This document describes systems and techniques that may be used to provide a rich word processing application that runs through a web browser and interacts with a server system that manages access to, and editing of, documents by the application. The application may operate according to a model-view-controller paradigm. The model of a document may be downloaded form a server to each client on which the document is being viewed or edited. The model may take a variety of forms, including a one-dimensional character string that is supplemented by a parallel sparse map of styles. The character string can include the actual alphanumeric characters in the document and certain control characters such as paragraph breaks. The map of styles can include pointers to locations in the character string, and may include tags that turn on and turn off styles in the document so as to create runs of characters having particular styles (e.g., fonts, font sizes, bold, underline, italics, etc.). The view may take part or all of the model as it is represented on the client device, and render it into a document object model (DOM) that is accessible to a web browser. The web browser may then display the document, along with chrome (e.g., buttons and pull-down menus) around the document so that the user may conveniently edit and otherwise interact with the document. The controller may intercept keystrokes and mouse actions, among other things, taken with respect to the displayed document, and may update the model and upload such changes, or mutations, to the server system, among other things. To provide near or actual WYSIWYG capability, the view may place new characters (or other spacers) with their formatting each in an off-screen iFrame'd HTML span element to determine the proper area to allot for each character and to determine a position for a next character (and whether a line break will be needed). The view may then treat the displayed area for the document as a canvas on which to place a variety of synthetic items that represent the model with various formatting applied.

Such features may, in certain implementations, provide one or more advantages. For example, a rich browser-based word processing application can be provided to a user, so that she can receive the various benefits of cloud computing (e.g., access from a common browser interface, access without needing to buy and/or download special non-browser application, and ability to share documents more easily across the internet) with the power and flexibility of traditional desktop applications (e.g., WYSIWYG presentation of document) and other features, such as real-time collaborative document editing among multiple users.

In one implementation, a computer-implemented method for presenting a document for interaction with a user in a web browser is disclosed. The method comprises accessing an electronic model of the document, and determining, with a computing device, positions for items in a visual rendering of the electronic model based on relative sizes and positions of other items in the electronic model. The method also comprises generating, with the computing device, a document object model (DOM) that defines an editing surface, wherein the DOM (a) places placing the items at the determined positions on the editing surface, (b) places a graphic element that represents a cursor at a determined location on the editing surface, and (c) is arranged to receive user input on the editing surface and to correlate a location of the received user input to a location in the electronic model. The method may further comprise receiving an entry of a character to the editing surface, determining a display style for the character, placing the character at a determine size with the style in a browser display area that is not visible to the user, and measuring the size of the browser display area to determine a location to display a cursor on the editing surface. The browser display area can comprise an HTML span element, and the cursor can be provided as an HTML image element. The method can also include receiving a copy command from the user, and in response, populating text that is selected in the browser display area to a hidden contentEditable element, placing focus on the contentEditable element, and making the populated text available to a copy function of the browser. The method can further comprise receiving a paste command from the user, and in response, and reading text from a contentEditable element into which the browser has placed selected text, and transforming the text in the contentEditable element into the electronic model of the document.

In certain aspects, the method further comprises uploading, from the computing device to a central server system that is remote form the computing device, information about changes to the document model so that the central server system may maintain a document model that matches the document model on the computing device. Also, the uploading can be performed separately for substantially each and every character submitted to the document by a user. Moreover, the method can include receiving, from the central server system, information about changes made to the document by users remote from the computing device, revising the electronic document model to reflect the changes, and automatically rendering at least the revised portion of the document model to update the DOM so that the changes made by the users remote to the computing device are reflected in the DOM.

In another implementations, a computer-implemented web browser-based document editing system is disclosed that comprises a first rich text model on a client computing device for storing a format for a rich document having text and formatting definitions for the text, and a view programmed to render the model for display to an editing surface that displays the rich document. The system can also comprise a controller to intercept and interpret inputs made by a user with respect to the document in the view and to cause the rich text model to be revised in accordance with the user inputs. Moreover, the system can include a second rich text model at a server system remote from the client computing device, and wherein the controller is programmed to provide data that reflects the inputs to both the first and second rich text models. In addition, the system can include a timer that gathers user inputs over a defined time period before providing data that reflects the inputs to the server system.

In certain aspects, the method also comprises a browser display area that is not visible to a user of the browser, and wherein the view is programmed to render characters entered by a user to the browser display area to determine dimensions for displaying the characters with the view. The browser display area can comprise an HTML span element, and the view can be programmed to render the model to a document object model (DOM) for the web browser.

In yet another implementation, a computer-implemented web browser-based document editing system is disclosed that includes a first rich text model on a client computing device for storing a format for a rich document having text and formatting definitions for the text; a view of the model that is a visual representation of a portion of the model with formatting applied to the model; and means for generating the view from the model and for updating the view in response to receiving keystrokes by a user of the client computing device. In other implementations, tangible recordable storage media are disclosed that can store instructions that, when executed, performed any of the operations discussed above in this section.

The details of one or more embodiments are set forth in the accompanying drawings and the description below. Other features and advantages will be apparent from the description and drawings, and from the claims.

DESCRIPTION OF DRAWINGS

FIG. 1 is a conceptual diagram of a browser-based word processing system.

Like reference symbols in the various drawings indicate like elements.

DETAILED DESCRIPTION

Figure 2A:
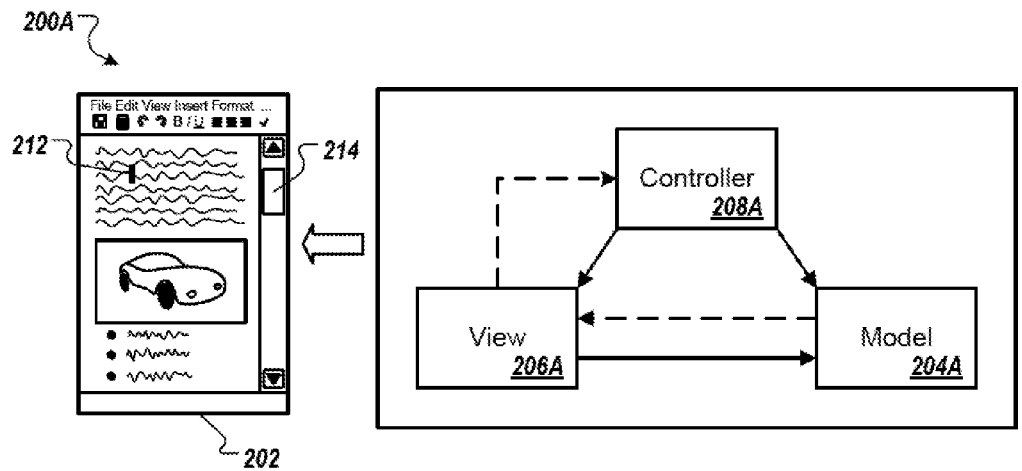
FIGS. 2A and 2B are block diagrams showing components of a model-view-controller implementation of a spreadsheet application.

This document describes systems and techniques for browser-based word processing applications. As discussed in more detail below, a client-based application that runs in a web browser, such as using HTML and JavaScript code, may download a portion of a document model from a server system that hosts the online word processing functionality. The application may create a user interface with the browser, and may place an editing surface on the display of the browser where the body of the document is to be displayed. The application may intercept keystrokes and other inputs by the user and may determine how the inputs are to be displayed by placing them in an off screen or a highly minimized HTML span element, and measuring the size of such an element to determine the size the characters will be when they are properly displayed. The application may also display a synthetic cursor on the editing surface and use the measurements from the span element to determine the location at which to index the cursor after a user has typed a character or made other changes to the document. As the user makes such changes, they may be added to the local model, and in turn added to the display in the browser by rendering the model or the changes to the model into a document object model (DOM) that is accessed by the browser in a familiar manner.

Such changes may also be uploaded to the hosted server system, so that they may be reflected in a master model that is maintained there. To enable collaborative editing of a document, the changes may be uploaded frequently, such as with every keystroke or other identifiable input by the user, or every particular time period, such as time periods for a fraction of a second, such as 100, 200, 300, or 400 ms.

FIG. 1 is a conceptual diagram of a browser-based word processing system 100. The system 100, in this example, may be implemented using a standard web browser 104 that can download from a hosted server system program code for generating a word processor application within the browser 104, and code that represents a document model 102 of a document to be displayed by the browser 104. Thus, the system 100 includes both a client, and a server that is providing code to the client and potentially receiving updated document models from a client, though the server has been omitted in this figure for clarity. Additional details about an example server system may be seen in FIG. 2C below.

As shown here conceptually, the application centers around a web browser 104 that may take a variety of forms, including any one of the standard publicly available web browsers. As is familiar, the web browser 104 includes a toolbar 118, which displays browser buttons and a browser address bar in a typical format. Below the toolbar 118 is a variety of chrome 120 that has been provided as part of the word processing application loaded on the browser 104. The chrome 120 may take a variety of forms and may be laid out in a variety of ways, though a simplified representation is shown here for clarity. The chrome 120 may include pull down and pop-up menus in a familiar form with which the user may interact. The chrome 120 may also include selectable controls, in the form of icon buttons that a user may click with a mouse or other pointer to perform familiar operations, such as saving or printing a document, undoing or redoing changes, and changing the format and layout of a document, or selecting text within a document.

A content area 122 is displayed below the chrome 120 and shows the text of a document that a user is currently editing in the browser 104. In this example, the user has typed a single sentence, has then turned on underlining, and has typed the first part of a second sentence. As shown by keyboard 108, the user has just recently pressed the "S" key on the keyboard 108 to continue building the sentence that the user is editing. A controller 106, which may be implemented in a variety of familiar forms, may be listening to inputs provided to a computer that is running browser 104, and may intercept and interpret such inputs. For example, the controller 108 may recognize that focus was on the word processing application in the browser 104 when the "S" key was pressed, and may thus interpret that input as a user intent to add the letter at a location in the document where the cursor is currently positioned.

The controller 106 may, when appropriate, report its observations back to the model 102. For example, the controller 106 may track a location in a character string of the model 102 that corresponds to a location of the cursor in a display of the model. The controller 106 may then edit the model 102 in order to reflect the new character that has been typed by the user. Similarly, the controller 106 may recognize that a user has selected a certain span of text, may associate that span with locations in string that mark the beginning and end of the span, and may then recognize that the user has selected a button for making the highlighted text in the span bold, underlined, or italicized. In such a situation, the controller 106 may cause an entry to be added to a style map (which stores formatting information for the document) that marks the index locations in the model 102 for the beginning and end locations of the selection, so as to reflect such a change in the model 102.

In one example for a model, such as model 102 shown in the figure, the text of a document may be shown in simple plain text one-dimensional character string, and changes in the formatting of the document may be indicated by control characters that are placed in line with the string of text. For example, control characters may also be made up of plain text, but may be preceded by a control character or characters, such as a single or double backslash, among others, which signal that their text is not to be displayed, but is to be used to affect the layout of a display of the document. Although not shown here, the model 102 may be supplemented by a style map in which more complex styles can be applied to ranges of text in the model 102. Also, the model or the style map may point to one or more external entities, such as digital images, tables, and other such entities, so as to indicate that the entities should be inserted into a display of the document when the model 102 is rendered for display.

Such rendering of a model into a displayable formatted document may occur with the use of a layout engine 110. The layout engine 110 may implement a view within a traditional model-view-controller arrangement. The layout engine 110 may parse a character string from the model 102 and may refer to a style map to affect formatting and layout for the text in the string. The layout engine 110 may then convert such formatting into a document object model (DOM) that it provides to browser 104.

The layout engine 110 may be responsible for the positioning of document content and a synthetic cursor in the content area 122. The cursor may be synthetic in that it may simply be an HTML image element, span element with distinctive background color, or similar structure that is placed in the content area 122 at a location in which the application has determined the user has positioned the cursor, either directly by positioning and clicking with a pointer, or indirectly by typing characters. As such, the element will look to a user like it is an actual cursor sitting to the right of the most recently-typed character, except in the situation in which a line break has occurred. The cursor may be set as a 2 px wide span with a set background color inside the line DIV that corresponds to the current position in the document.

To determine the position for the cursor, the layout engine 110 can look in the paragraph's line cache for the line in which the cursor is located, and determine the top position of the line. The engine 110 may then loop through the line's word buffer and increment a width counter until the desired index word in the line is reached, and then loop the spacers or characters in the word until the desired index position is reached, which provides the left position of the character on which the cursor is currently positioned.

If the cursor has a selection or a range of characters, it may be stored as an offset of the active selection at a selected mark location. To draw such a selection, an absolutely-positioned span may be added to each line DIV with a slight opacity and a background color that contrasts with the main background, and the span may be positioned and sized to match the selection (where the height of the span will be the height of the selection). Such an approach may provide the impression of highlighted text across a span.

The layout engine 110 may also handle items that are embedded into a document, such as digital images. Embedded objects may be placed at an (x, y) position and bound to a paragraph. When a line is being constructed and an embedded object is located by the layout engine 110 within the bounds of the top of the line and the top+height of the line, the line may be split in two by adding a span with the width of the embedded object plus some padding, where appropriate. The embedded object will thus be relatively positioned at an (x, y) coordinate inside the paragraph div. When the paragraph's y-position changes, the embedded object's position will be recomputed so that it moves with the paragraph. Such an approach may permit the user to better control the particular location of the embedded objects, such as images and animations, in the document.

The cursor that is shown in browser 104 is a vertical line but it may also be displayed in other forms, such as a box that has a contrasting color with a background color of the document, or a horizontal line. As shown in FIG. 1, the position of the cursor is set at a dimension 124 down from the top of the document and an x-direction 126 from the left edge of the document. The base point for such measurements may, however, be any appropriate positions, such as other corners of the document or other such locations. The dimensions may also be measured in any appropriate manner, such as a number of pixels, or another accepted rule of measurement. The position of each character may then be recorded as the layout engine 110 renders model 102 into a DOM.

As shown here, an example is provided in which a new character "S" has been typed by a user at the position of the cursor. The controller 106 intercepts the character, recognizing that the focus of the computer was on the content area 122 of the browser 104 at the time the key was pressed, and has added the character at the appropriate location into model 102, at the end of the model 102. To determine how the character is to be displayed in the content area 122, however, the system 100 will need to determine the size of the character, which can depend on the font size, whether the character is bolded, and other factors. In order to determine the size of the character, an off-screen span element 112 is generated in the browser 104 with the character in the element 112. The size of the element 112 may then be determined by standard mechanisms. For example, when the "S" key's selection is recorded on a on KeyDown event, the span may be set up as follows:

<span style=font-weight: bold;>A</span>

The offsetHeight and offsetWidth of the span may be used to quickly obtain a size for the character, and to set the new location for the cursor.

In order to locate various items such as lines and characters properly in the content area 122, the DOM may include three layers or levels of DIVs: an editor DIV level, a paragraph DIV level, and a line DIV level. Each paragraph will have a corresponding div inside the main editor div, and the paragraph div's may be stacked on top of each other so that changes in the height of each paragraph div can automatically be reflected in paragraphs below the affected paragraph. Each paragraph's div may also be cached in a rich text model for the document.

These various mechanisms may allow the application running in the browser 104 to provide appropriate layout for the character in the future position of the cursor. For example, if a character has increased in font size substantially from the previous characters, the entire line may be shifted downward appropriately so that the new character will not overlap with the line above. Also, the cursor may be moved in the x-dimension 126 an appropriate distance to take into account the width of the character, as determined in the span element 112. In this manner, the system 100 may support multi-sized fonts, proportionate spacing with characters, and other similar advanced mechanisms for word processing.

With the entered character's parameters determined, and the position for the next character determined, then, the layout engine 110 places the character "s" in the content area 122, and may regenerate an image for the cursor in a new appropriate location, by updating a DOM for the document. This process may be repeated for each character that is typed into the document model 102.

With the height and width of each character position, or spacer, determined for a paragraph or larger portion of a document, the layout engine 110 may loop through all the spacers and build up lines by concatenating the character spacers into a string and incrementing a width counter by the width of each character until a full line-width is taken up, and the line div is filled. To permit wrapping to occur at word breaks, each space or hyphen may commit the buffered spacers to the line and increment the width counter to the width of the word that is committed. Any remaining non-committed characters get passed to the next line div. Each line is thus its own div, and a child of the corresponding paragraph div. Also, each of the div's may be relatively positioned, so that they can be easily stacked on top of one another, so as to give a visual effect of normal line wrapping.

For example, given the text "Hi my name is Micah what is you name", and where the margin cuts off in the middle of the name Micah, the DOM will look like:

```
<div>                                    //Main editor DIV
    <div style="position: relative">     //paragraph DIV
        <div style="position: relative">Hi my name is Micah</div>
        <div style="position: relative">what is you name</div>
    </div>
</div>
```

As the layout engine 110 constructs each line, it may cache the height, width, top, and left of each line in a separate line cache inside a paragraph object, so as to permit for a quick lookup of such parameters. The line cache may also store the location in the character string for the start and end position for the line. The y-position of each paragraph may thus be determined quickly by taking the offsetTop of the paragraph div.

Style formatting may be applied using span's in each div. For example, while a line is being constructed by the layout engine 110, each spacer will check the formatting of the spacer behind it to determine how that spacer's formatting is different from its own formatting. If there is a difference, a new span will be created in the DOM, and the next spacers will thus be inserted into that span until a new formatting is encountered.

As one example, given the text "Hi my name is Micah what is your name", where the first "name" is bolded and the second is italicized, the DOM may look as follows:

```
<div>
    <div style="position: relative">
        Hi my<span style="font-weight: bold">name</span> is Micah
    </div>
    <div style ="position: relative">
        What is your <span style="font-weight: italic">name</span>
    </div>
</div>
```

Although not shown, the system 100 may, when it has updated the model 102 and the content area 122 (or before or simultaneously with doing so), transmit information reflecting the input character or other change to a central server system, so that the new character added by the user may be passed to other client devices that are currently accessing the document. Such information may also include an identifier for the particular user, and a revision or mutation identification number that will allow the server system to track the various updates it receives from different clients, and to resolve collisions or inconsistencies among overlapping revisions that it receives from multiple different users or clients.

As an example of another feature available in the system 100, automatic line breaks may be enabled in certain implementations. For example, a preset width may be established for each line in a document. When characters on a line are determined to reach that value (such as by measuring by adding the widths of each entered character since the previous automatic line break using the techniques discussed above), the characters will begin to overflow onto the next line, which may be indexed down an appropriate distance. That distance may be selected using the largest character height of any character that is currently in the line. Where an overflow occurs in the middle of a paragraph, the overflow may be allowed to cascade onto the next line until every character fits tightly into the margins of the page. Thus, for example, if a user is entering characters in the middle of a pre-existing line, the characters at the end of the line will be pushed off to the next following line as it is determined that they will not fit on the current line. Characters at the end of the new line and the next following line may in turn be pushed off the end all the way to the end of the paragraph. Breaks between the lines may be limited also so that they occur only at recognizable breaking characters, such as non-alphabetic or nonnumerical characters, including space characters.

The system 100 may, in certain embodiments, include cut-and-paste functionality. Pasting may occur in the system 100 by intercepting paste events (e.g., CTRL-V) from the browser using the controller 106 and setting focus of the computing device to a contentEditable browser element. With the focus set in this manner, the browser 104 may then paste into that element, which may be off-screen, invisible, or otherwise generated so as not to be readily seen or recognized by the user. The system 100 may then read the contents of the contentEditable element and transform the raw HTML from that element into a form that is compatible with data model 102, using appropriate heuristics and other rules.

Copying may occur in a similar manner. For example, when a user makes a selection in the content area 122, the selection contents may be populated to a hidden contentEditable element. When a copy event is received for the selection, the focus of the system 100 may then be applied to the contentEditable element in the browser's native, and the browser's native copy may take the text from the element.

Similarly, interaction with an input method editor (IME) may occur in similar manners. An IME is a mechanism by which CJK languages may have input received using traditional Roman characters (A, B, C, . . . ), and a user, in cooperation with an application, may convert those input characters to appropriate graphical characters, such as Chinese or Japanese kanji characters. In implementing IME input functionality, a transparent contentEditable element may be provided behind the editing surface of the content area 122. When a compose event is received indicating that a user would like to compose a character in the IME, the contentEditable element is pulled to the surface, and the first paragraph indent of the contentEditable is set so that it matches the cursor position of the main surface in the content area 122. The margins of the contentEditable is also set to match the margins of the main editing surface. As a result, the contentEditable element looks, to the user, as if it is an ordinary part of the editing surface for the content area 122. When the user then composes a character through the IME, the user will see his or her regular IME interface pop up to aid in composing the character or characters. When the system 100 receives an event indicating an end to the composition, such as from the IME application or applet, the system 100 may read the content of the IME and place that content into the data model 102, such as by execution of the controller 106.

The system 100 may also resolve situations in which a document uses a right-to-left language such as Arabic, Persian, and Hebrew, or left-to-right, such as English, French, Spanish, Norwegian, and Italian, or a combination that shifts from one to the other and back (e.g., when English proper nouns are included in Arabic text). In such situations, the Unicode bidirectional algorithm (Bidi) may be applied to determine the appropriate representation of the text to be stored in the model 102, and rendered to the content area 122 by way of the layout engine 110. For example, tags or markers indicating a style change in the direction in which text is to be displayed may be included in a character string in the model 102, or in a style map that points to the endpoints of any text that is to have its direction shifted from its surrounding text. The Bidi algorithm may be implemented, for example, using JavaScript that also implements other features of the layout engine 110.

Along with layout engine 110, there may be support for screen reader functionality with system 100. In particular, a screen reader may access the DOM or the model 102 in a manner similar to the access by layout engine 110, and may provide a spoken representation of what is shown in the content area 122. When edits are made, for example, the text around the location of the edits in model 102 may be identified, so as to provide a spoken indication of the context into which the edits are occurring. Other spoken indications of what is displayed in content area 122 may also be provided in familiar manners.

In certain situations, particular treatments of cursor position may need to be implemented. For example, where ligatures occur (i.e., multiple characters in order that render as something totally different than those characters, or graphemes are joined as a single glyph), the system may apply two steps. For non-Devanagari unicode characters, the system builds ligature tables as part of the character sizing process to allow the sizing process to recognize when two characters in a row will form a smaller/larger glyph than the sum of the width of the two characters individually. If the ligature is identified during processing, the cursor will be placed in the middle of the width of the implicitly drawn glyph.

For Devanagari characters, the layout engine 110 treats a combined glyph as if it were one character, so that the cursor does not go inside of a ligature. For Devanagari unicode characters (U+0900-U+097F), the system 100 can generate a pre-caned ligature table that describes which sequences of characters and character patterns will produce glyphs that will throw off cursor position significantly inside of a word, where such data may be sent asynchronously from a stateless server.

The system 100 may also support printing in similar manners. For example, pagination can be determined easily using the knowledge about line height and control over the flow of lines, discussed above. The word wrap locations that are determined may then be sent to a rendering canvas such as a hidden HTML frame from which the document can be directly printed using standard printing functionality of the browser 104.

Figure 2B:
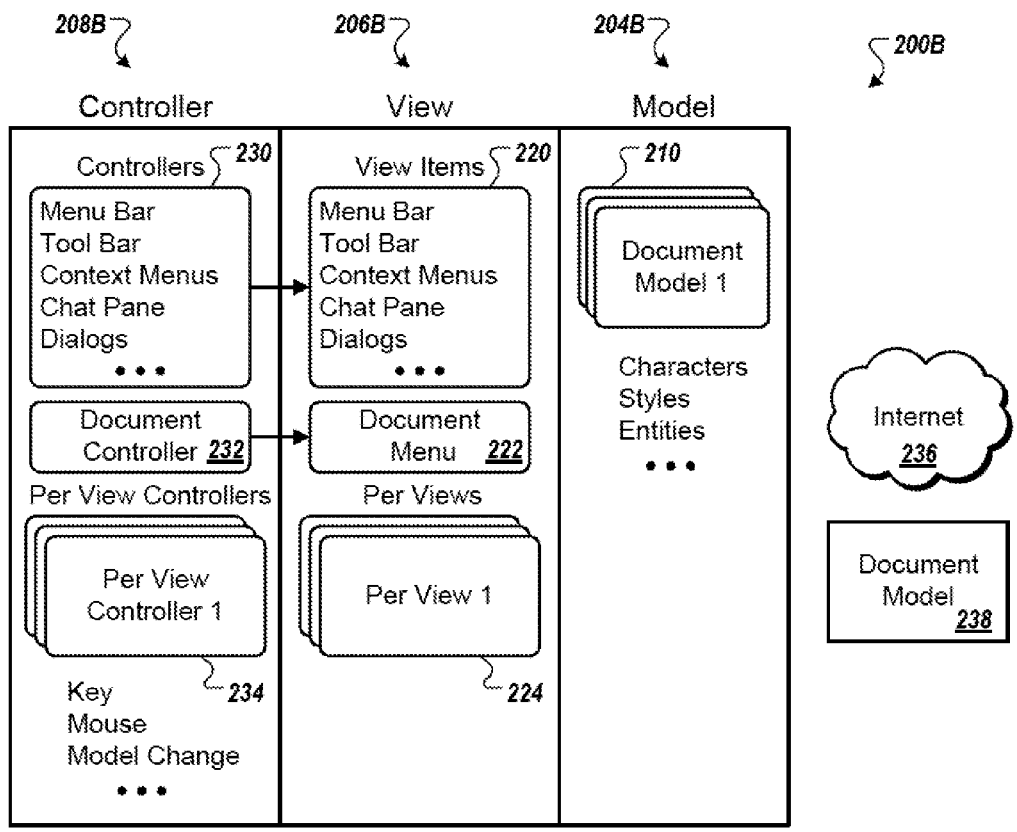

FIGS. 2A and 2B are block diagrams showing components of a model-view-controller (MVC) implementation of a word processing application. The word processing application, for example, may be executed by a web browser, such as the browser 104 shown in FIG. 1. In general, the MVC implementation provides for the download of a model from a remote server to a client, and the rendering of the model into a DOM to form a view of the model that may be managed directly by the web browser. The controller may intercept actions, such as clicks on icons and keystrokes on a keyboard, and may cause such actions to be implemented, such as by adding typed characters both to the model on the client and on the remote server (e.g., uploading changes or mutations back to the server, which may be programmed with rules for integrating the mutations into a master model, so that the client-side model matches the master model as the user works).

Referring to FIG. 2A, a computer application 200A may be configured to display a word processing document 202. The application 200A includes, controls, or accesses a model 204A, a view 206A, and a controller 208A. For example, the model 204A can contain a representation of the state of the word processing document 202, including such elements as character data, formats, styles, paragraphs, sections, breaks, lists, tables, images, formulas, and the like. The view 206A can represent a rendering of the current state of the model 204A. For example, the view can provide a visual representation that combines the substance of the document (e.g., its raw text) with formatting and layout information. The view, when displayed by a browser, provides a form of, if not an exact, WYSIWYG representation of the document that is defied by the model.

In addition to the rendering of the model, the view 206A can be used for presenting to the user visual information that is associated with the word processing document 202, such as visible user controls for the application (i.e., chrome) and other word processing data. The controller 208A can respond to changes in the model 204A or the view 206A, and can update the state of the model 204A and the view 206A. As shown in FIG. 2A, solid lines between the model 204A, the view 206A, and the controller 208A represent direct references between components, and dashed lines represent listeners. For example, listening for user interaction (e.g., provided by user controls) with the presentation of the view 206A, the controller 208A can modify the model 204A, and can in turn modify the view 206A either directly or indirectly (by causing the view 206A to obtain new model data and render that new data).

As another example, listening for changes in the model 204A made by another user in a collaborative environment or changes made through an automated data update or another such process, the view 206A can request re-rendering of an updated model or portion of the model. For example, if a user of a client device is only one of multiple users concurrently editing a document, characters and other edits by the other users may be passed to the client device from the server system (and edits by the first user may be passed from the client device to the server system), and the client code may add characters to the model in near real-time, and those changes can be passed into the DOM (e.g., via rendering by the view 206A)—so that each user can see the edits made by the other users very quickly.

Referring to FIG. 2B, the model-view-controller implementation as presented in FIG. 2A is shown with additional detail. As shown, a computer application 200B (corresponding with the application 200A) includes, controls, or accesses a model 204B (corresponding with the model 204A), a view 206B (corresponding with the view 206A), and a controller 208B (corresponding with the controller 208A).

The model 204B can include one or more document models 210. Each of the document models 210 can represent a separate document in a collection of word processing documents, for example, and each of the models 210 can include elements such as characters, styles, and entities. Other forms of documents such as spreadsheet documents may also be represented. Model data and elements may be provided by a master document model 238 that is stored on a remote server system via a connection to a network 236 (e.g., the internet).

Generally, document text in the models 210 is associated with a series of characters. For example, the characters may represent raw text for the word processing document 202, and may also include certain reserved control characters such as characters that indicate the occurrence of a break (e.g., a paragraph break, a page break, or the like). In some implementations, each of the document models 210 can include a one-dimensional character string that includes document characters in an order in which they appear in the document.

Styles may be used to store information related to the presentation of document text (e.g., the series of characters). For example, text styles may include character formatting attributes such as font, font size, bold, italics, underline, foreground and background colors, alignment, and other such attributes. In some implementations, styles included in each of the document models 210 can be stored in a sparse map. For example, the sparse map can include markers that correspond to changes in styles in the document and pointers to positions in the character string. The pointers, for example, can define style runs between matched markers by specifying locations along the character string at which style changes occur. In some implementations, the markers in the matched set may be arranged to be tethered to certain characters in the one-dimensional character string. For example, if text is added between two paired markers, the pointer for one of the markers may shift by an integer equal to a number or characters associated with the added text.

Entities in each of the models 210 may be used to store information related to objects outside of the document models 210, and may be pointed to by references in the model such as in the one-dimensional character string. For example, entities may include objects such as lists, tables, images, and the like. In some implementations, the references can include object identifiers and pointers to the one-dimensional character string (e.g., from the sparse map) indicating where in the character string the object should appear, or identifiers from within the character string that point to the entities and mark the locations at which the particular entities are to appear in the document when it is rendered and displayed. For example, an image that should appear between two paragraphs may be associated with a special character appearing in the character string after a paragraph marker for one paragraph, and before the first character of the next paragraph.

The view 206B can generate one or more view items 220 that may enable the user to interact with the application 200B, such as menu bars, tool bars, context menus, chat panes, dialogs, other chrome, and the like. The view 206B can also include a document menu 222 that presents information and control options related to one or more of the document models 210, and one or more of a set of per views 224. For example, one of the per views 224 may be associated with a corresponding one of the sheet models 210. Each of the per views 224 may include components or controls such as selectors (e.g., cursors, selection indicators, and the like) navigation tools (e.g., scrollbars, document maps, outlines, and the like).

The controller 208B can include one or more controllers 230 that may listen for and handle user interactions with one or more of the view items 220. In some implementations, each of the controllers 230 may be associated with a corresponding one of the view items 220. For example, menu bar controllers may listen for and handle user interactions with menu bar view items (e.g., relating to various actions that a user would typically take from a row of menu selections), tool bar controllers may listen for and handle user interactions with tool bar view items, context menu controllers may listen for and handle user interactions with context menu view items, and so forth. The determination that a particular event has occurred may cause a particular controller 230 to execute predetermined code or otherwise carry out a predetermined process, such as by updating a local model when a key press is received and uploading information about the key press to a central server system.

The controller 208B can also include a document controller 232 that may listen for and handle user interactions with the document menu 222. In addition, the controller 208B can include a set of per view controllers 234, where each of the controllers 234 is configured to listen for and handle user interactions with a corresponding view in the set of per views 224. Each of the per view controllers 234 may include various controller types, such as key controllers for intercepting and interpreting keyboard input, mouse controllers for intercepting and interpreting mouse input, and model change controllers for intercepting and interpreting model change events.

Generally, the controllers included in the controller 208B can transform user-generated events into model and view mutations. For example, based on a user action, a relevant controller (e.g., a controller configured for handling the action) may receive one or more events associated with the action and make transient changes to the view 206B before the user action is committed. Then, based on the event properties, the relevant controller can construct a command to mutate the model 204B, execute it, and send the updated model or just data for the particular mutations to the remote server system that hosts the document model 238 via the network 236.

The controllers may also use timers or other mechanisms to aggregate inputs or mutations, so as to lower the number of updates that need to be made to the local or server-based models. For example, the controllers may implement changes to the local and/or server-based model in batches that occur within predefined time windows, such as by waiting 200 ms after an initial keystroke is sensed before sending to the central server system data about all keystrokes received in the time window.

Many user interactions with the application 200B are possible, including interactions that are included in single-user sessions and in multiple-user sessions. For purposes of illustration, a series of example user interactions with the application 200B are described here. For example, to enter text into the word processing document 202, the user may proceed by using a computer mouse to select a desired document location 212 for text insertion by clicking on the document 202. A mouse controller that is included in the per view controllers 234 (e.g., a per view controller associated with the active document 202) can listen for an event that is associated with the mouse positioning input and the mouse click input, and upon intercepting it, can modify the view 206B (e.g., a per view associated with the active document) to provide the user with a visual indicator for the selection (e.g., a cursor). For example, the selected location 212 may be associated with a visible cursor (where the cursor is a graphical HTML element such as an image, and is displayed at an appropriate location on a canvas where the document is also being displayed so as to create a synthetic presentation that makes the graphical element look like a true cursor), may be highlighted, or may receive another such modification. Additionally, the selected location 212 may also be associated with a location in the model 204B. For example, a position in a one-dimensional character string included in the document models 210 can be determined, based on the selected location 212.

Using a keyboard, the user may enter desired text at the document location 212. A keyboard controller that is included in the per view controllers 234 can listen for events associated with the keyboard input, and upon intercepting them, can modify the view 206B to provide the user with a visual indicator for the input. For example, as the user types text at the location 212, the document 202 may be visually updated to present the text to the user. Additionally, the keyboard controller can modify the model 204B to include entered text by copying the user input to the model. For example, a one-dimensional character string included in the document models 210 can be updated to include the entered characters. Additionally, the document model 238 may be updated to include the entered text, thus coordinating the model 204B with the document model 238. For example, changes to the model 204B may be transmitted to the document model 238 via a connection to the network 236. In some implementations, changes may be sent periodically (e.g., once every 100 milliseconds, once every 200 milliseconds, once every 500 milliseconds, once every second, once every 2 seconds, or another appropriate time interval). In some implementations, changes may be sent based on user activity (e.g., entering a paragraph break, applying a formatting change, navigating to another document section, clicking a save button, or some other action).

As another example, the user may insert an entity (e.g., a list, a table, a hyperlink, an image, or another such object) into the document 202. For example, the user may proceed by using a computer mouse to select a desired document location (e.g., the location 212) for entity insertion by clicking on the document 202. Similar to interactions associated with text entry, for example, a mouse controller included in the per view controllers 234 can listen for an event associated with the mouse positioning input and the mouse click input, and upon intercepting it, can modify view 206B to provide the user with a visual indicator for the selected location. Next, for example, the user may specify the entity for insertion by interacting with one of the view items 220 or with the document menu 222. For example, the user may make a selection on a menu bar to indicate an intent to insert an image. A dialog associated with image selection may be presented to the user, enabling the user to select the desired image.

Model-view-controller interactions for adding the entity within the application 200B may operate in a similar manner as when a user is entering text. For example, as the user inserts the image at the location 212, the document 202, as it is displayed on an editing surface, may be visually updated to present the image to the user. Additionally, the model 204B may be modified to include a reference to the inserted image by writing the reference to the model. For example, one of the document models 210 (e.g., the model associated with the active document) can be updated to include a reference to the inserted image. A one-dimensional character string may be updated to include a special character indicating the position of the image, and the reference to the image may be stored.

When the document 202 is rendered from the model associated with the active document, for example, the image content may be integrated into the document 202 that is displayed to the user. In some implementations, the one-dimensional character string may include multiple instances of an identifier for a single entity. For example, the image may be positioned at multiple locations in the document 202, specified by multiple positions for the identifier in the one-dimensional character string. Thus, a single external entity may be shared within a document, or may be shared among multiple documents—both by common references to the external entity. The document model 238 may be updated to include the inserted image(s), thus coordinating the model 204B with the document model 238. For example, changes to the model 204B may be transmitted to the document model 238 via a connection to the network 236.

Additionally, for example, the user may modify the formatting of text and entities presented in the document 202. By interacting with one of the view items 220 or with the document menu 222, the user can indicate a desired formatting change (e.g., a change such as changing a font of a selected text block to bold, changing a group of words to be organized as a list, changing a paragraph justification to be right-aligned, changing a document line spacing to be double-spaced, and the like). One of the controllers 230 or the document controller 232 can listen for user interaction with the view 206B, and upon detecting the interaction, can modify the model 204B to include the formatting change. For example, one of the document models 210 (e.g., the model associated with the active document) can be updated to include an element in a sparse map of styles defining the formatting change, and defining the locations along the one-dimensional character string at which the changes in style are to occur. A model change controller included in the per view controllers 234 can listen for events associated with the model 204B and can send a request to the view 206B to update accordingly (e.g., by rendering a display of formatted text). In some implementations, the model change controller may also handle model change events that result from collaborative model changes.

In some implementations, a document model that is one of the document models 210 may include a subset of the document data from the document model 238. For example, if the document model 238 is substantially large, a subset of the data (e.g., a subset associated with a portion of the document that is currently viewable by the user, plus perhaps a buffer area around the currently viewable area, or viewport, so that small scrolling distances may be handled by normal browser interactions without a need to render additional content form the model) may be provided to each client that is currently displaying the word processing document 202. As another example, the full document model 238 may be provided to each client.

The user may elect to view a different portion of the word processing document 202 than the user is currently viewing in the web browser. For example, by interacting with a scrollbar 214 that is associated with the document 202, the user may indicate an intent to view document data beyond the current viewport, or displayed area. One of the per view controllers 234 (e.g., the per view controller associated with the active document) can listen for user interaction with the view 206B or other appropriate component (e.g., the visual portion of the scrollbar 214), and upon detecting the interaction (e.g., via a computer mouse), can request for the view 206B to redraw itself.

If the user specifies a small amount of scrolling, the view 206A may cause itself to be displayed by the browser. For example, a buffer area of document data may be maintained in the model 204B (already rendered into a DOM) around the data that is displayed in the visible area of the document 202. If the amount of scrolling specified by the user is determined by the view 206B to be within the bounds of the buffer area of data, the document display may be updated using such pre-rendered data. If the user specifies a larger amount of scrolling, such that the scrolling specified by the user is determined by the view 206B to be outside of the bounds of the pre-rendered buffer data, for example, additional document data from the document model 238 may be downloaded via the network 236. Thus, the model 204B may be updated with information that is related to additional document sections, and the document may be rendered using the downloaded data.

Figure 2C:
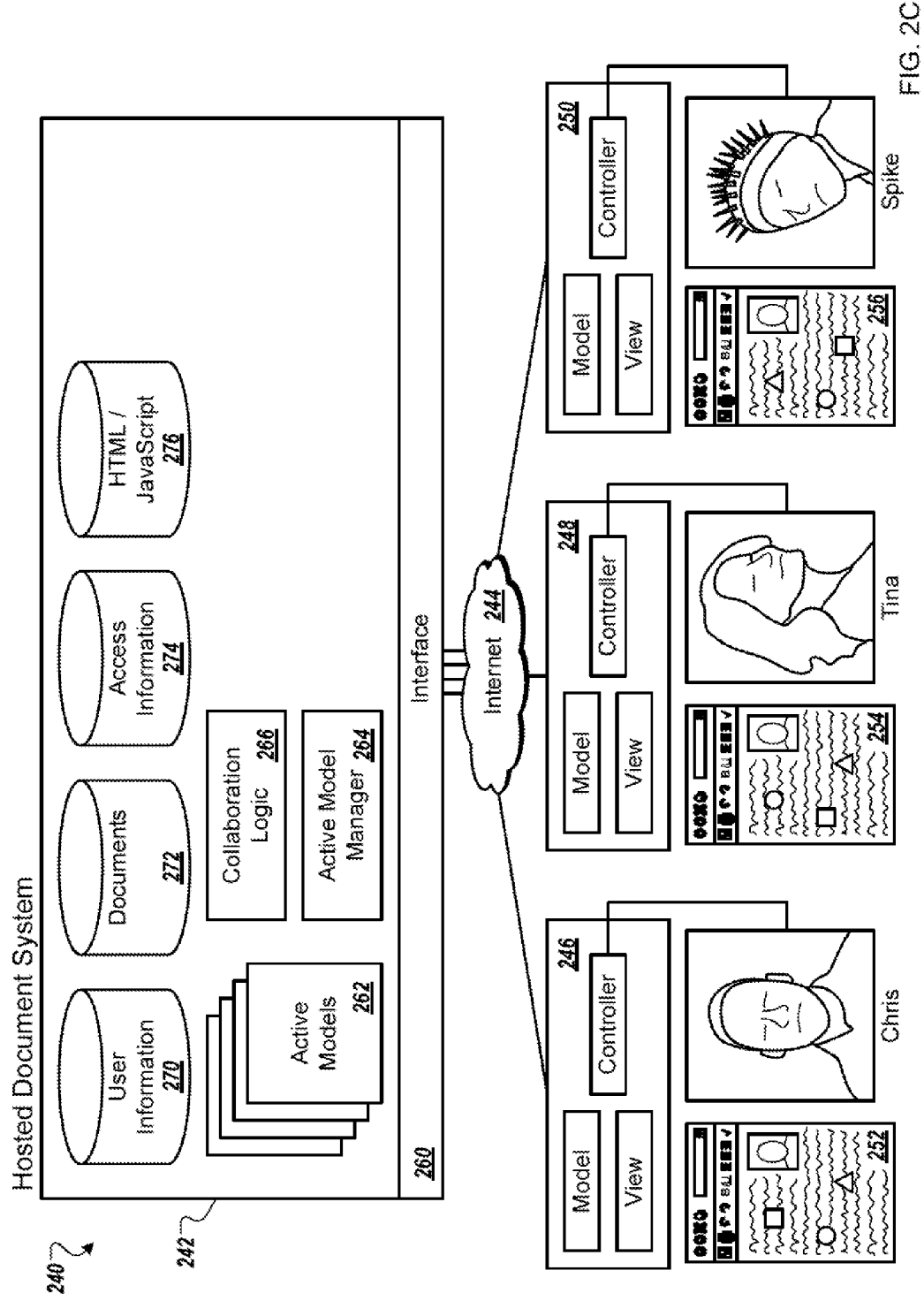
FIG. 2C is a block diagram of a system for permitting collaborative editing of a documented by multiple users through a hosted server system.

FIG. 2C is a block diagram of a system 240 for permitting collaborative editing of a document by multiple users through a hosted server system. In general, the system 240 includes a hosted document system 242 executed by one or more computer servers (e.g. a server farm). The hosted document system 242 can provide document hosting services to any number of client users via connections to a network 244 (e.g., the internet). Using the document system 242, client users may create new documents, modify existing documents, share documents, and collaboratively work on documents with other users.

For purposes of illustration, document hosting services may be provided to browser applications 246, 248, and 250. Each of the applications may be executed by a web browser (e.g., by the browser 104, as shown in FIG. 1), and may include model, view, and controller components (e.g., similar to the application 200, shown in FIGS. 2A and 2B). The applications 246, 248, and 250 may be configured to execute computer code (e.g., JavaScript and other code running in a web browser) to display a word processing interface and to perform word processing functions associated with one or more documents served by the hosted document system 242.

As shown in the present illustration, Chris can interact with a web browser 252, Tina can interact with a web browser 254, and Spike can interact with a web browser 256. Each of the browsers 252, 254, and 256 may access any appropriate number of browser applications (e.g., embedded applications, widgets, web services, and the like). For example, browser 252 can access application 246, browser 254 can access application 248, and browser 256 can access application 250.

By interacting with controls presented by the web browsers, for example, users of the system 240 (e.g., Chris, Spike, and Tina), can work with one or more documents that are managed and provided by the hosted document system 242. For example, the users may access existing documents provided by the system 242 or may create new documents. Each of the browser applications 246, 248, and 250 can communicate with an interface 260 of the document system 242 via the network 244. For example, communication between the browser applications 246, 248, and 250 and the interface 260 may include HTTP (HyperText Transfer Protocol) requests, SOAP (Simple Object Access Protocol) messages, or some other appropriate such protocol. In some implementations, client browsers may maintain browser channel connections to the interface 260 for communicating session data between clients and the document system 242.

The hosted document system 242 can include sub-components for storing and managing information related to system users, documents, and browser applications. The various sub-components may be executed by the same computer server, or may be distributed among multiple computer servers. The sub-components may communicate with each other directly (e.g., via messages, transferred files, shared data, remote procedure calls, or some other protocol) or indirectly (e.g., by communicating with an intermediary application). Generally, sub-components included in the document system 242 can communicate with client applications (e.g., the browser applications 246, 248, and 250) via the interface 260.

The system 242 can also include one or more data stores for storing user information 270. For example, the user information 270 can include information associated with system users (e.g., Chris, Tina, and Spike). Such information may include general user information and login information (e.g., user names, passwords, e-mail addresses, and the like), information related to one or more devices employed by the users to access the system (e.g., IP addresses, browser versions, connection speeds, and the like), and system usage information (e.g., access times, amount of data accessed, and the like), to name a few possibilities.

In some implementations, the system 242 can include one or more data stores for storing documents 272 in the form, e.g., of document models like those discussed above and below. For example, the documents 272 can include word processing documents created, maintained, and accessed by system users. As another example, the documents 272 may be generated by an automated process, such as a news feed or another reporting process that is based on gathered data. Information associated with the documents 272 can include document data models, document text, document formatting information, entities (e.g., tables, images, videos, sound clips, or other such objects), and the like.

The system 242 can also include one or more data stores for storing access information 274. For example, the access information 274 can include information that can be used for controlling access of system users (e.g., users included in the user information 270) to system documents (e.g., documents included in the documents 272). Generally, system users may set access privileges for documents that they create or manage. For example, Chris may create a personal letter document and specify the document as being private. Thus, other users of the system (e.g., Tina and Spike) may be unable to locate or access the document, which may have access control limitations applied to it in various familiar manners. As another example, Tina may upload a schedule document and specify the document as being shared and as being viewable by Chris. Thus, Spike may be unable to locate or access the document, but Chris may be able to access the document in view-only mode. In some implementations, Tina, as the document creator, may retain full access to the document, having privileges such as the ability to add, edit, and delete content, having the ability to change privileges, and having the ability to remove the document from the system 242. As another example, Spike may create a document related to a group project and specify Chris and Tina (and himself) as having full access privileges. In some implementations, user groups may be included in the access information 274. For example, a user may create a group and may add one or more users to the group. Rather than select individual users when assigning document permissions, in some instances, users may select a group including the users. The access information 274 may also include such information as the user ids of document users, document access times, and the like.

In some implementations, the system 242 can include one or more data stores for storing HTML/JavaScript 276. For example, the HTML/JavaScript 276 can include application code for executing the browser applications 246, 248, and 250. The application code may be provided to any of the browsers 252, 254, and 256, for example, when browser users access a web site associated with the hosted document system 242. Upon receiving a request for any of the documents 272, for example, the system 242 may provide the HTML/JavaScript 276 in addition to one or more of the documents 272. Using the HTML/JavaScript 276, the browser applications 246, 248, and 250 may render the document data and may provide an interface that enables browser users to interact with the documents. In some implementations, technologies other than HTML and JavaScript may be used for providing application code. For example, for web browsers including an appropriate plugin, another type of compiled or interpreted code may be provided.

Many possible user interactions with the system 240 are possible, including interactions in single user sessions and in multiple user sessions. For example, in a collaborative editing session, multiple users may simultaneously interact with a document. Although the applications used for editing the document may each behave independently, the applications may follow the same editing rules for updating and rendering the document model. Thus, multiple users may have similar experiences with the document, and may work together to produce a similar document model.

In an example session, to initiate collaborative word processing document editing, Chris accesses the hosted document system 242 by directing the web browser 252 to a web site (e.g., a domain) that is associated with the system 242. Receiving login information from the browser 252, the system 242 can verify Chris's information against the user information 270. Upon verification, the system 242 can provide HTML/JavaScript 276 to the browser 252 for executing an online word processor (though certain of the code may be passed before verification occurs). The browser can include a portion of the HTML/JavaScript 276 as the browser application 246, render chrome associated with the application, and display the application to Chris.

Chris may interact with the browser application 246 via a set of controls displayed in an application view within the browser 252. For example, Chris may indicate an intent to create a new document by clicking a button or selecting a menu option displayed in the application view. The application controller can intercept the command and pass the command to the interface 260 via the network 244. Receiving the command, the system 242 can add a new document to the documents 272, and add information associated with the new document to the set of active models 262. For example, the active models 262 may include model information associated with documents currently being edited by other users of the system 242.

A corresponding version of a model in the set of active models 262 may be present at the browser application 246. For example, Chris may add content and make changes to the word processing document provided by the view of the browser application 246, and the corresponding content and changes can be applied to a model that is accessed by the browser application 246 (and associated HTML and JavaScript code running in the browser), and may be propagated to the active models 262.

Chris may also share the document with one or more users. For example, using controls associated with the application 246, Chris may select Tina and Spike as users who may share the document, and he may assign both Tina and Spike full document privileges. For example, Tina and Spike may be included in a presented list of users commonly sharing documents with Chris, and Chris may select Tina and Spike from the list. As another example, Chris may provide the e-mail addresses of Tina and Spike. The system 242 can store the sharing information (e.g., user ids of other users having access to the document, permissions levels for the users, and the like) in the access information 274. In some implementations, the system 242 may send messages (e.g., e-mail, text messages, instant messages, and the like) to users who have received document privileges. In some implementations, users who have received document privileges may receive a link (e.g., a hyperlink or URL) to the shared document.

Upon receiving notification of the shared document, Tina and Spike may access the document using their web browsers 254, 256. For example, upon verification, the system 242 can provide HTML/JavaScript 276 to the browser 254, 256 for executing an online word processor. The browsers can include a portion of the HTML/JavaScript 276 as the browser applications 248, 250, can render chrome associated with the application, and can display the applications.

Additionally, an active model manager 264 included the hosted document system 242 can identify which documents are currently open by users of the system, and users who are active in the document (i.e., Chris), and can set up a collaborative session. For example, the active model manager 264 can determine that the document requested by Tina and by Spike is associated with one or more of the active models 262. The system 242 can then forward the document request to a computer hosting the document, and the computer can associate Tina and Spike with the current session. Additionally, the browser applications 248, 250 can download model data associated with the active model(s) 262, and render and display the downloaded model data. In some implementations, the system 242 can create model instances for Tina and for Spike and can add the instances to the active models 262.

In the present example, users may be able to view their own cursors as well as the cursors of other users in a collaborative session. For purposes of illustration, each user's cursor appears to himself/herself as a square. For example, Chris may view his own cursor as a square, and the other users' cursors as a circle or as a triangle. Correspondingly, Tina and Spike may also view their own cursor as a square, and the other users' cursors as circles or triangles. In some implementations, the cursors may appear as a different color (which could not be shown here). For example, cursors may generally appear as underlines or vertical bars, where the cursors are different colors for each user.

In the present example, changes made by each of the users can be sent by the browser applications 246, 248, and 250 to the hosted document system 242, coordinated, and sent back to the other users. In some implementations, the changes can be sent at time intervals (e.g., once every 100 milliseconds, once every 200 milliseconds, once every 500 milliseconds, once every second, once every 2 seconds, or another appropriate time interval). In some implementations, sending can be based at least in part on user activity or inactivity. For example, during periods of user inactivity, changes may be sent or received less frequently than during periods of user activity. When a user is entering data or when a local user hovers over a cursor for another user, a pop-up label that identifies the other user may be displayed, so that the local user can identify who is making changes—though the label may then disappear so that it does not continue to block the document.

To coordinate multiple document changes made by multiple users, for example, the hosted document system 242 can include collaboration logic 266. For example, the collaboration logic 266 can be executed by one or more code modules executed by one or more computer servers associated with the system 242. In some implementations, portions of the collaboration logic can be executed by the browser applications 246, 248, and 250. Generally, the logic 266 can resolve data collisions (e.g., instances where multiple users edit the same document portion or apply conflicting document formats) by applying a consistent set of rules to all user changes. Although, in some instances, one or more users may be prompted to disambiguate a change. For example, if Tina makes a document change and Spike makes a conflicting document change before receiving Tina's change, Spike may be presented with a message from the browser application 250 including possible conflict resolution scenarios. In some implementations, one user may be identified as trumping other users in collision situations. Chris, as the document creator, for example, may be able to apply his changes over changes made by either Tina or Spike in cases of conflict. For example, if Spike edits a passage at the same time as Chris deletes it, the passage (including Spike's edits) may be deleted.

Thus, the system shown in FIG. 2C may handle collaborative editing of a hosted document by multiple users at one time. The management of such editing can involve a low amount of data passing between the various sub-systems in the system.

Figure 3:
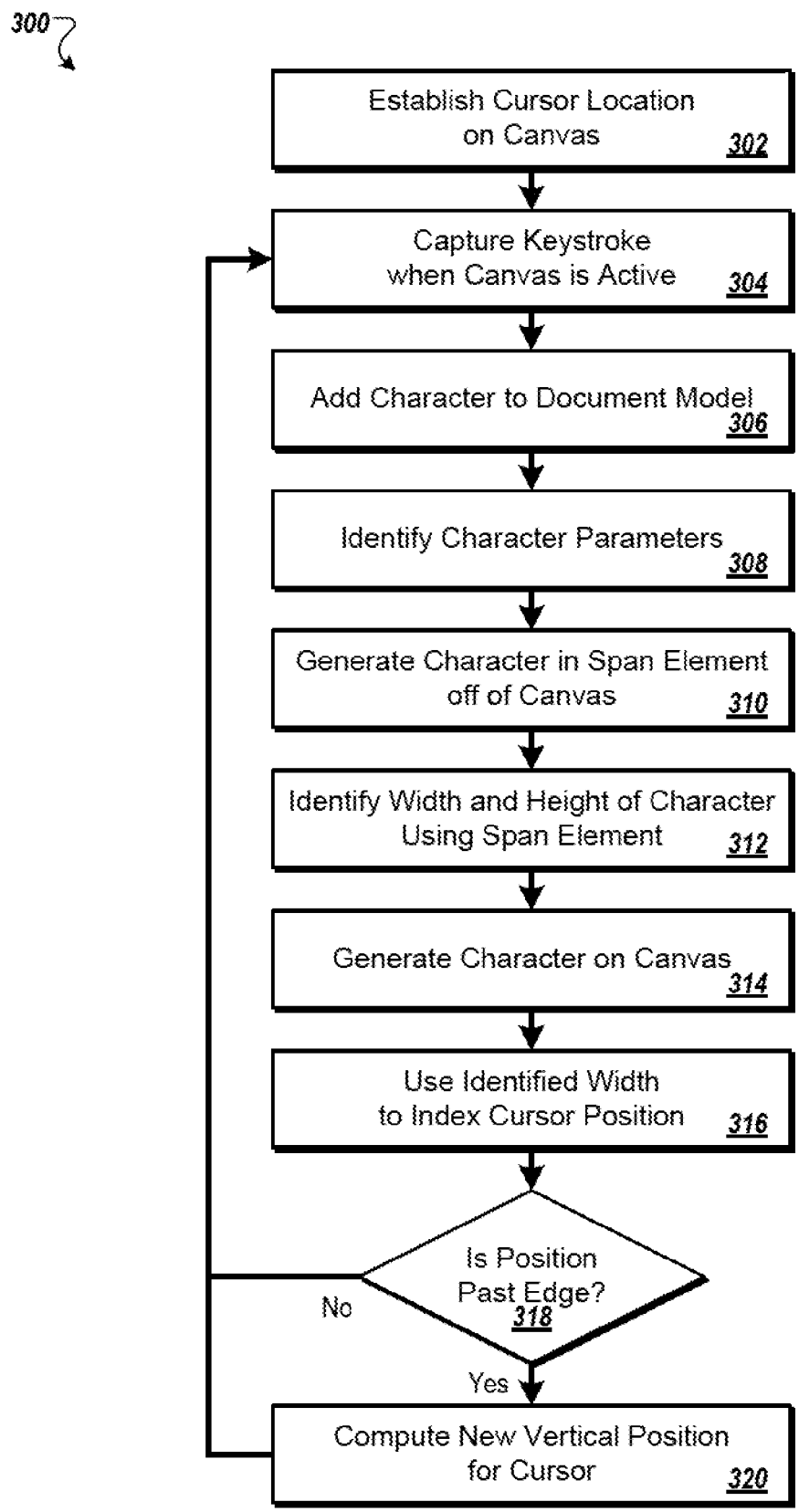
FIG. 3 is a flow chart of an example process for displaying an electronic document and interacting with a user who is editing the document.

FIG. 3 is a flow chart of an example process for displaying an electronic document and interacting with a user who is editing the document. In general, the process tracks the steps that may be taken by a browser-based application when a user enters one or more characters into a document that is being displayed by the application. The process may result in the displayed document (and a corresponding document model) being updated so that the user immediately sees the effect of his or her actions.

The process begins at box 302, were a cursor location on a canvas is established by the application. For example, a user of the application may click in an area of a paragraph of text in order to start editing the middle of that paragraph of text. To determine the location of the cursor, its X, Y coordinates on an editing surface may be compared to cached coordinates corresponding to characters that are on the surface, to indicate the locations of each character that is being displayed on the editing surface. Such a comparison may indicate a closest space between characters, which is where the cursor may be drawn so that the user can see that his or her input for placing the cursor has been recognized by the application.

At box 304, a keystroke is captured when the canvas is active. In particular, the web browser may be only one of multiple applications that are currently executing on a computer, and keystrokes captured by the computer may be relevant to the web browser (and the word processing application running in the web browser) only when the web browser is the focus of the computer. The keystroke may be captured, for example, by a controller such as controller 106 in FIG. 1 above. The controller may identify a location in a document model, such as document model 102 above, and may insert the character at that location (box 306).

The application may also be executing a layout engine such as layout engine 110 in FIG. 1 above. The layout engine may identify character parameters for the character, at box 308. Those parameters may include, for example, a font height, a bold, underlined, or italics for the character, or other appropriate parameters that are relevant to the location in which the characters to be placed in a display area for a word processing application.

At box 310, those parameters are used to generate the character in a span element is located in a position off the content area or canvas where the portion of the document is being displayed to a user. For example, a hidden span element may be constructed in manners like those discussed above. At box 312, the width and height of the character may be determined using the span element, such as using the techniques described above that are discussed with respect to FIG. 1. At box 314, the character is generated on the canvas or content area in the browser with the appropriate formatting, and at the location determined by using the span element. Also, at box 316, a new location for a cursor may be determined, because the cursor has been indexed forward by the entry of the new character. Thus, the new location of the cursor may be identified as a location that is to the right of the previous location for the cursor, by the width of the new character, as determined from the span element.

At box 318, the process determines whether this position is past the edge of a line or margins for the line in which the character is to be added. If it is not, the cursor stays in the line in which it was previously located, though with the computed horizontal shift. If it is beyond the edge, a new vertical position for the cursor is computed at box 320, such as by adding a vertical distance that corresponds to the span element that was identified in box 312. The element that generates the cursor may then be re-implemented at the new location. This process may then repeat for each input or small group of inputs provided by the user (e.g., where the grouping of operations is selected to be small enough that lag in updating the model is not a distraction to the user).

In the example just discussed, words are allowed to extend slightly past a right margin of a line. However, in other implementations, word wrap may be implemented using techniques discussed above with respect to FIG. 1. Also, the particular process shown here omits relevant details discussed above with respect to FIG. 1, for simplicity. For example, spacers other than alphanumeric characters may be provided by a user, such as by a user attempting to insert an entity that is referenced by a document model. The processing of such alternative types of entries may occur by mechanisms that are discussed above, or that may be conveniently determined by the discussions above.

Figure 4:
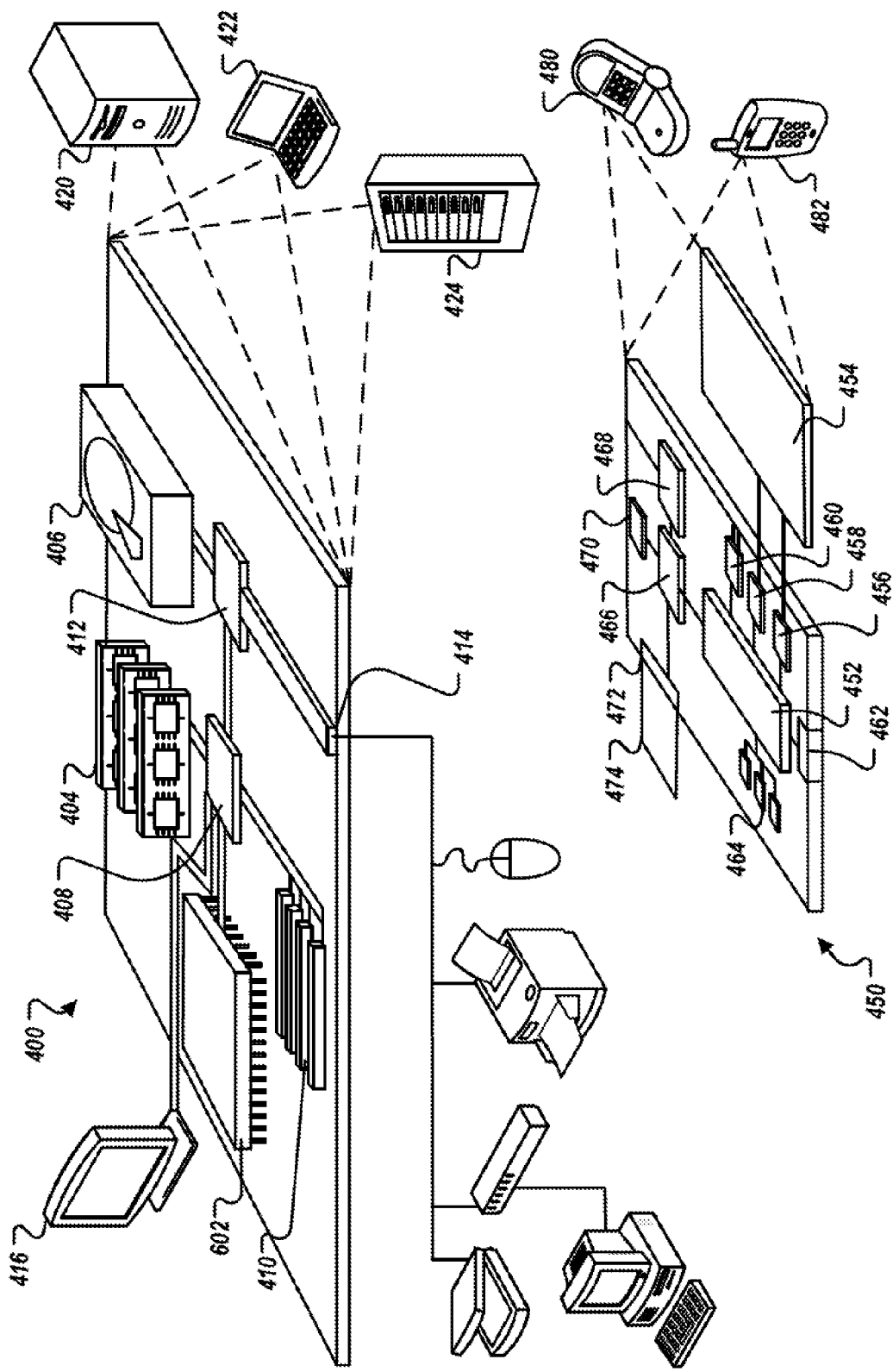
FIG. 4 shows an example of a computer device and a mobile computer device that can be used to implement the techniques described here.

FIG. 4 shows an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to television advertisements, but other forms of future, viewership-based advertisements may also be addressed, such as radio advertisements and on-line video advertisements.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for presenting a document for interaction with a user in a web browser, the method comprising:
    accessing an electronic model of the document;
    determining, with a computing device, positions for items in a visual rendering of the electronic model based on relative sizes and positions of other items in the electronic model;
    generating, with the computing device, a document object model (DOM) that represents at least part of the electronic model and defines an editing surface, wherein the DOM:
        (a) places the items at the determined positions on the editing surface,
        (b) places a graphic element that represents a cursor at a determined location on the editing surface, and
        (c) is arranged to receive user input on the editing surface and to correlate a location of the received user input to a location in the electronic model;
    receiving an entry of a character to the editing surface;
    generating an off-screen display area including the character; and
    measuring a size of the off-screen display area to determine a location to display the character on the editable surface.

2. The computer-implemented method of claim 1, comprising determining a location to display a cursor on the editing surface based on the measured size of the off-screen display area.

3. The computer-implemented method of claim 2, wherein the browser display area comprises an HTML span element.

4. The computer-implemented method of claim 2, wherein the cursor is provided as an HTML image element.

5. The computer-implemented method of claim 1, further comprising receiving a copy command from the user, and in response, populating text that is selected in the browser display area to a hidden contentEditable element, placing focus on the contentEditable element, and making the populated text available to a copy function of the browser.

6. The computer-implemented method of claim 1, further comprising receiving a paste command from the user, and in response, reading text from a contentEditable element into which the browser has placed selected text, and transforming the text in the contentEditable element into the electronic model of the document.

7. The computer-implemented method of claim 1, further comprising uploading, from the computing device to a central server system that is remote form the computing device, information about changes to the document model so that the central server system may maintain a document model that matches the document model that is on the computing device.

8. The computer-implemented method of claim 1, wherein the uploading is performed separately for substantially each and every character submitted to the document by a user.

9. The computer-implemented method of claim 1, further comprising receiving, from the central server system, information about changes made to the document by users remote from the computing device, revising the electronic document model to reflect the changes, and automatically rendering at least the revised portion of the document model to update the DOM so that the changes made by the users remote to the computing device are reflected in the DOM.

10. A computer-implemented web browser-based document editing system, comprising:
   a first rich text model on a client computing device for storing a format for a rich document having text and formatting definitions for the text;
   a view programmed to render the model for display to an editing surface that displays the rich document;
   a controller to intercept and interpret inputs made by a user with respect to the document in the view and to cause the rich text model to be revised in accordance with the user inputs; and
   an off-screen browser display area that is not visible to a user of the browser,
   wherein the view is programmed to:
      render characters entered by a user to the off-screen browser display area; and
      determine dimensions for displaying the characters with the view by measuring a size of the off-screen display area.

11. The system of claim 10, further comprising a second rich text model at a server system remote from the client computing device, and wherein the controller is programmed to provide data that reflects the inputs to both the first and second rich text models.

12. The system of claim 10, further comprising a timer that gathers user inputs over a defined time period before providing data that reflects the inputs to the server system.

13. The system of claim 10, wherein the browser display area comprises an HTML span element.

14. The system of claim 10, wherein the view is programmed to render the model to a document object model (DOM) for the web browser.

15. A computer-implemented web browser-based document editing system, comprising:
   a first rich text model on a client computing device for storing a format for a rich document having text and formatting definitions for the text;
   a view of the model that is a visual representation of a portion of the model with formatting applied to the model; and
   means for generating the view from the model and for updating the view in response to receiving keystrokes by a user of the client computing device, where the keystrokes are associated with one or more characters;
   means for generating an off-screen display area including the one or more characters; and
   means for measuring a size of the off-screen display area to determine a location to display the one or more characters on the editable surface.

16. One or more non-transitory tangible recordable storage media storing instructions that, when executed, perform operations comprising:
   accessing an electronic model of the document;
   determining, with a computing device, positions for items in a visual rendering of the electronic model based on relative sizes and positions of other items in the electronic model;
   generating, with the computing device, a document object model (DOM) that represents at least part of the electronic model and defines an editing surface, wherein the DOM:
      (a) places the items at the determined positions on the editing surface,
      (b) places a graphic element that represents a cursor at a determined location on the editing surface, and
      (c) is arranged to receive user input on the editing surface and to correlate a location of the received user input to a location in the electronic model;
   receiving an entry of a character to the editing surface;
   generating an off-screen display area including the character; and
   measuring a size of the off-screen display area to determine a location to display the character on the editable surface.

17. The non-transitory tangible recordable storage media of claim 16, wherein the operations comprise determining a location to display a cursor on the editing surface based on the measured size of the off-screen display area.

18. The non-transitory tangible recordable storage media of claim 16, wherein the operations further comprise receiving a copy command from the user, and in response, populating text that is selected in the browser display area to a hidden contentEditable element, placing focus on the contentEditable element, and making the populated text available to a copy function of the browser.

19. The non-transitory tangible recordable storage media of claim 16, wherein the operations further comprise receiving a paste command from the user, and in response, reading text from a contentEditable element into which the browser has placed selected text, and transforming the text in the contentEditable element into the electronic model of the document.

20. The non-transitory tangible recordable storage media of claim 16, wherein the operations further comprise uploading, from the computing device to a central server system that is remote form the computing device, information about changes to the document model so that the central server system may maintain a document model that matches the document model that is on the computing device.

\* \* \* \* \*